(12) United States Patent
Hållstedt et al.

(10) Patent No.: US 6,277,315 B1
(45) Date of Patent: Aug. 21, 2001

(54) METHOD FOR MANUFACTURING SEALING RINGS

(76) Inventors: Göran Hållstedt, Lillgatan 4, S-330 12 Forsheda (SE); Leif Gustavsson, Björsgårdsvagen 18, S-331 95 Värnamo (SE); Börje Hellström, Backagårdsvägen 16, S-342 34 Alvesta (SE); Johnny Motes, 2200 S. McDuffie St., Anderson, SC (US) 29624

( * ) Notice: Subject to any disclaimer, the term of this patent is extended or adjusted under 35 U.S.C. 154(b) by 1246 days.

(21) Appl. No.: 08/511,451

(22) Filed: Aug. 4, 1995

Related U.S. Application Data

(62) Division of application No. 08/026,981, filed on Mar. 5, 1993, now abandoned.

(30) Foreign Application Priority Data

Mar. 10, 1992 (SE) ...................................................... 9200764

(51) Int. Cl.[7] .............................. B29C 45/14; B29C 33/12
(52) U.S. Cl. ............................ 264/250; 264/259; 264/268
(58) Field of Search .................................... 264/250, 255, 264/259, 275, 267, 254, 268

(56) References Cited

U.S. PATENT DOCUMENTS

| | | | |
|---|---|---|---|
| 4,379,559 | 4/1983 | Bohman | 277/207 |
| 4,410,479 | * 10/1983 | Cyriax | 264/255 |
| 4,693,483 | * 9/1987 | Valls | 277/207 A |
| 4,818,209 | 4/1989 | Petersson et al. | |
| 4,826,028 | * 5/1989 | Vassallo et al. | 277/207 A |
| 4,834,398 | 5/1989 | Guzowski et al. | |
| 5,064,207 | * 11/1991 | Bengtsson | 285/110 X |

FOREIGN PATENT DOCUMENTS

| | | | |
|---|---|---|---|
| 667458 | * 11/1938 | (DE) | 285/345 |
| 1924410 | * 11/1970 | (DE) | 277/207 A |
| 2135841 | * 2/1973 | (DE) | 285/110 |
| 2510234 C2 | 2/1983 | (DE) . | |
| 454900 | * 11/1936 | (GB) | 277/207 A |
| 2092241 | * 8/1982 | (GB) | 277/207 A |
| 12517 | * 2/1978 | (JP) | 285/110 |
| 436664 | 1/1991 | (SE) . | |

* cited by examiner

*Primary Examiner*—Angela Ortiz
(74) *Attorney, Agent, or Firm*—Baker & Daniels

(57) ABSTRACT

A method for manufacturing at leat two different types of sealing rings, each sealing ring comprising at least two annular elements which are bound to each other and with regard their hardness are of different kinds. An annular element (1) of a first kind is manufactured with one and the same design irrespectively of the type of the sealing ring which is to be manufactured and is provided with at least two separate binding surfaces (20, 22) for binding to element or elements (34, 50) of the second kind. The element or elements (34, 50) of the second kind is or are manufactured with a design adapted with regard to the desired type of sealing ring and is or are bound to one of or each one of the binding surfaces (20, 22) provided at the element of the first kind.

The invention also relates to an annular element to be used for conducting the method.

8 Claims, 5 Drawing Sheets

METHOD FOR MANUFACTURING SEALING RINGS

This is a division of application Ser. No. 08/026,981, filed Mar. 5, 1993, now abandoned.

The present invention relates to a method of manufacturing at least two different types of sealing rings for sealing a space between an inner surface of a socket provided with an annular groove and an outer surface of a spigot end introduced into the socket in a pipe joint. The invention relates also to an annular element adapted to be used for manufacturing according to the method of the invention at least two different kinds of sealing rings.

Sealing rings for sealing a space between an inner surface of a pipe socket formed with a groove and an outer surface of a spigot end introduced into the socket comprises a sealing element which in order to provide its sealing function by compression, lip action or a combination thereof must consist of a relatively soft rubber-elastic material. A sealing ring as a whole consisting of a material which is sufficiently soft and elastic for effecting the sealing function is disadvantageous from the point of view that it is difficult to retain in a desired position in the groove of the pipe socket prior to and during the jointing of the pipes for establishing the pipe joint. There also exists the risk that a sealing ring of this kind shall be forced from its sealing position in the pipe joint if there is a great difference in the pressures at opposite sides of the sealing ring. In order to solve these problems and disadvantages it is known to provide the sealing ring with a retainer element of a material which is substantially more rigid than the rubber-elastic material of the sealing ring, for example plastic or rubber having great hardness. The retainer element can for example be constituted by a locking ring which is mounted in a groove formed in the rubber-elastic material of the sealing ring, for example as is previously known from the Swedish Patent Specification No 7803870.0. In order to provide the locking ring with satisfying characteristics with regard to the mounting as well as with regard to the locking action the size of the locking ring must within small tolerances be adapted to the diameter of the groove of the socket, in which the sealing ring shall be positioned. If the locking ring is too large in relation to the groove it is difficult to mount the ring and if it is too small there is an unsatisfying locking of the sealing ring. It is also a drawback that the sealing element and the retainer element of the sealing ring are constituted by separate parts which means that it is necessary to handle double as many parts as if the sealing ring consists of one single part and that the correct relative position between the sealing element and the retainer element can be lost during or after the mounting. It may also happen that the retainer element consisting of a separate ring or a sealing ring provided with such a retainer element can be distorted or twisted to a position which makes it difficult or even impossible to provide the pipe joint.

In order to obviate the disadvantages present in a sealing ring provided with a separate locking ring it is previously known to manufacture a sealing ring in which the sealing element and the retainer element are permanently bound to each other. Different types of such sealing rings are previously known. A previously known type of sealing ring is shown and described in the U.S. Pat. No. 4,834,398. The sealing ring according to this patent specification has a sealing element and a retainer element which are positioned axially adjacent each other and are connected with each other at a binding surface extending from the inner periphery of the sealing ring to the outer periphery thereof. In a sealing ring of the kind shown in said US patent specification the sealing ring is positioned in the groove of the socket so that the spigot end initially engages the retainer element when being introduced into the socket.

In another previously known type of a sealing ring comprising a sealing element and a retainer element bound thereto the sealing element and the retainer element are so positioned axially adjacent each other after the mounting of the sealing ring in the groove of the socket that the spigot end when being introduced into the socket initially engages the sealing element. A sealing ring of this kind is previously known from the U.S. Pat. No. 4,818,209. The last mentioned type of sealing ring can be used at the type of method in which the sealing ring is used as a mould portion when the pipe socket is manufactured. In accordance with this method the sealing ring is positioned on a mandrel whereupon a pipe end portion consisting of thermoplastic material softened by heating is pushed over the mandrel and the sealing ring positioned thereon. Thereby the pipe end portion initially engages the part of the sealing ring which is constituted by the retainer element designed so as to guide the pipe end portion over the sealing ring. The softened pipe end portion connects with the sealing ring which forms a groove in the pipe socket. When the pipe end portion and the sealing ring are separated from the mandrel by being withdrawn therefrom the sealing ring is retained in the groove in the socket in a locked-in position.

Also other types of sealing rings consisting of sealing elements and retainer elements bound thereto are previously known.

The object of the invention is to provide a method and a sealing element for facilitating the manufacturing of sealing rings of different types comprising at least two annular elements which are bound to each other and with regard to their hardness are of different kinds, such as a sealing element consisting of rubber-elastic material and at least one retainer element consisting of a material which is substantially more rigid than the rubber-elastic material of the sealing element, for example a plastic material.

In order to comply with this object the method according to the invention is characterized in that an annular element of a first kind is manufactured with one and the same design irrespectively of the type of sealing ring which is to be manufactured, the element of the first kind being at the manufacturing provided with at least two separate binding surfaces for binding to element or elements of the second kind, and that the element or elements of the second kind is or are manufactured with a design adapted with regard to the desired type of sealing ring and is or are bound to one of or each one of the binding surfaces provided at the element of the first kind.

An annular sealing element according to the invention is adapted to be used for manufacturing different kinds of sealing rings according to the method of the invention which sealing rings are adapted for sealing a space between an inner surface of a pipe socket formed with an annular groove and an outer surface of a spigot end introduced into the socket at a pipe joint, each sealing ring comprising at least two annular elements which are connected with each other and with regard to their hardness are of different kinds, such as a sealing element consisting of rubber-elastic material and at least one retainer element consisting of a material which is substantially more rigid than the rubber-elastic material of the sealing element for example a plastic material, the annular element being characterized in that it has at least two separate binding surfaces adapted to be bound to element or elements of the second kind, the element or elements of the second kind being formed and bound to the desired binding surface or surfaces with regard to the desired type of sealing ring.

Thus, by means of the method according to the invention it is possible to manufacture different types of sealing rings while using one and the same annular element, which substantially facilitates and reduces the costs of the manufacturing.

Different embodiments of the invention shall be described in the following with reference to the accompanying drawings.

Figure 1:
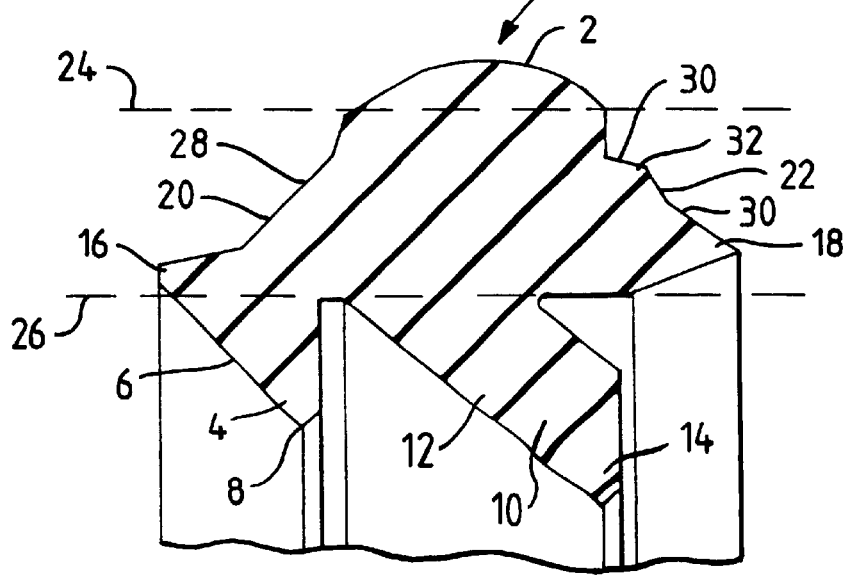
FIG. 1 is an axial section of an embodiment of an annular element according to the invention.

The element 1 according to the invention shown in FIG. 1 is of annular shape and is adapted to form a sealing element of a sealing ring for sealing a space in a pipe joint between two plastic pipes and preferably in a pipe joint between plastic pipes in which the pressure in the pipes is relatively high in relation to the pressure outside the pipes. The sealing ring is adapted to be mounted in an annular groove at the inner surface of a pipe socket into which the spigot end of another pipe is introduced for forming the pipe joint. Thereby, the sealing ring is adapted to be compressed between the bottom of the groove in the socket and the outer surface of the spigot end. The element 1 of the sealing ring which element is shown in FIG. 1 consists of rubber, for example a rubber having a Shore-hardness of for example 40–50°.

Thus, the annular element 1 shown in FIG. 1 is adapted to form a sealing element in a sealing ring. At its radially outer surface the element 1 has a surface portion 2 of a rounded shape and adapted to contact the bottom of the groove in the socket. At its radially inner surface the sealing element has an obliquely inwards directed lip 4. The lip forms a conical entering surface 6 which is initially engaged by the spigot end when the pipe joint is to be established by introducing the spigot end into the socket provided with the sealing ring. When the spigot end is introduced into the socket provided with the sealing ring dirt which is present on the outer surface of the spigot end will be wiped off from the outer surface by the edge 8 of the lip.

Axially inside the wiping lip 4 the sealing element has an obliquely inwards directed sealing projection 10. The sealing projection 10 has from its inner end initially a portion 12 having a constant thickness and merging into a portion 4 with reduced thickness.

At one side surface the sealing element 1 has between the surface portion 2 and the lip 4 a projecting edge portion 16. Between the surface portion 2 and the sealing projection 10 the sealing element 1 has an edge portion 18 projecting in the opposite direction in relation to the edge portion 16.

The projecting edge portion 16 forms part of a binding surface 20 at one side of the sealing element 1, while the projecting edge portion 18 forms part of a binding surface 22 positioned at the other side of the sealing element 1. The binding surfaces 20 and 22 are positioned between the axial planes 24 and 26.

The binding surface 20 forms a peripherally extending recess 28 having the object of increasing the area and efficiency of the binding surface. The binding surface 22 forms perpendicularly extending grooves 30 and a ridge 32 positioned between the grooves.

The sealing element according to FIG. 1 can be used for manufacturing two different types of sealing rings according to the method of the invention. The first type of sealing ring is shown in an axial section in FIG. 2. In this embodiment the sealing ring has a retainer element 34 which is bound to the binding surface 22 of the sealing element 1. Thus, in this embodiment of the sealing ring the binding surface 22 is not used for binding purposes. The sealing ring is manufactured by positioning the sealing element 1 in a mould space having a mould surface for forming the retainer element 34 in connection with the binding surface 22, whereupon a plastic material is injected into the mould space. The plastic material binds to the binding surface 22, and when the plastic material has been polymerized and the sealing ring has been removed from the mould it has the appearance as shown in FIG. 2.

The retainer element 34 has an outer conical surface 36 which connects with the surface portion 2 of the sealing element 1. In addition thereto the retainer element 34 has an obliquely inwards directed point 38 which is somewhat expandable in the radial direction. In this respect the retainer element 34 can be considered to be designed in accordance with the retainer portion of the sealing ring according to the U.S. Pat. No. 4,818,209.

Figure 2:
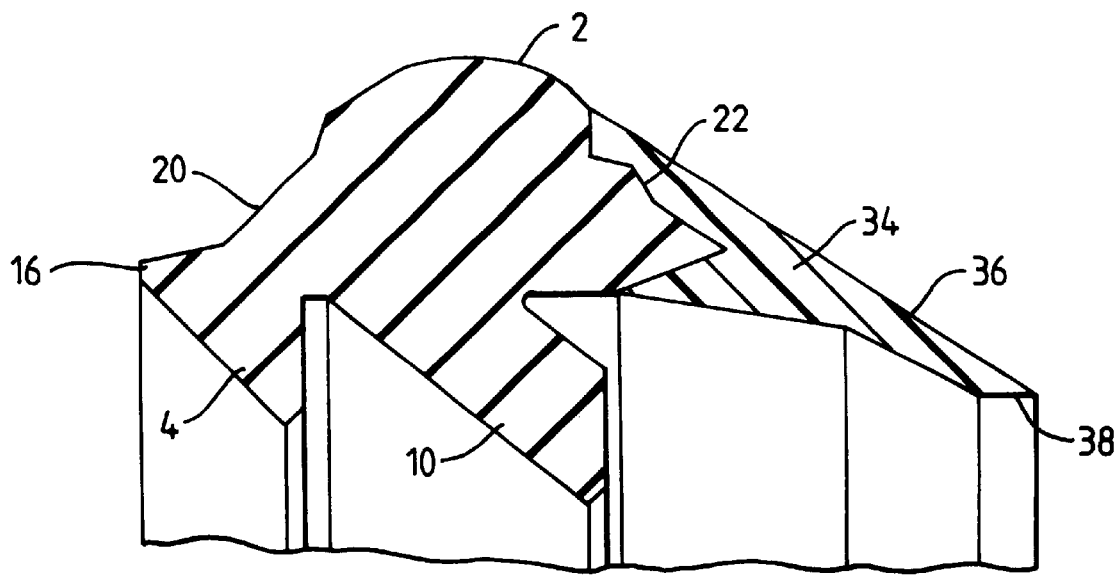
FIG. 2 is an axial section of a first type of sealing ring manufactured according to the method and by means of the element according to the invention shown in FIG. 1.
Figure 3:
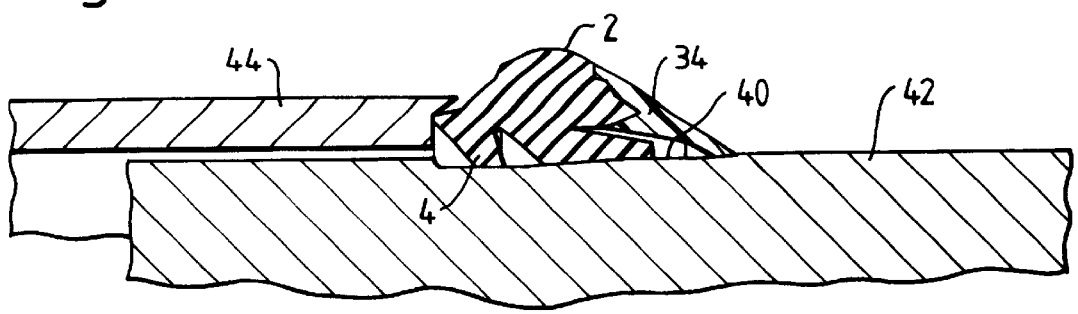
FIG. 3 shows the sealing ring of FIG. 2 in a position tensioned onto a mandrel.

The embodiment of the sealing ring shown in FIG. 2 is intended to be used as a combined moulding and sealing ring, and in accordance therewith the ring is positioned in a shallow groove 40 on a mandrel 42 in accordance what is shown in FIG. 3. An end portion of a thermoplastic material pipe softened by heating is pushed over the mandrel 42 and the sealing ring positioned thereon, while the ring is axially supported by a support cylinder 44. After the pipe end portion has been pushed over the mandrel 42, the sealing ring and the support cylinder 44 the support cylinder is withdrawn from the pipe end portion, whereby the pipe end portion will connect with the mandrel and the sealing ring while forming a groove for receiving the sealing ring. After the pipe end portion has solidified the mandrel is withdrawn from the pipe end portion, the sealing ring being left in the groove 47 formed in the socket 46. The socket 46 with the sealing ring positioned in the groove 47 therein has the appearance as shown in axial section in FIG. 4.

Figure 5:
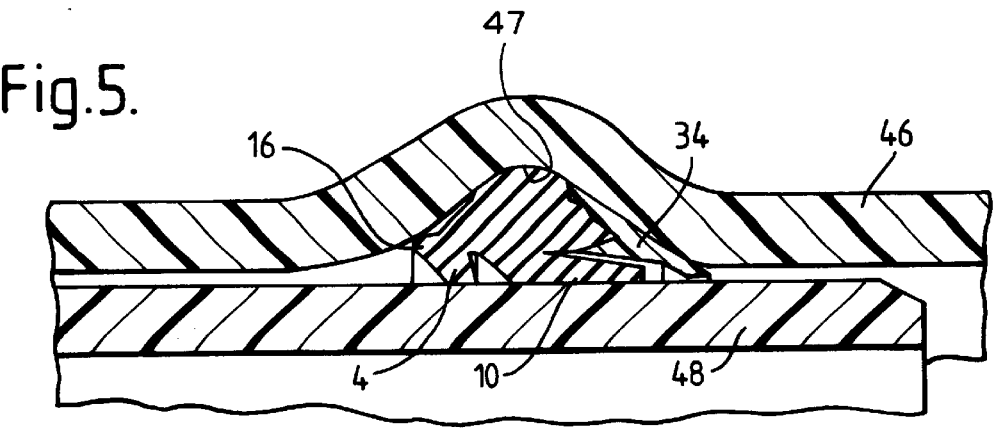
FIG. 5 is a section corresponding to FIG. 4 of a pipe joint in which the sealing ring according to FIG. 2 is included.

In FIG. 5 the sealing ring according to the embodiment of FIG. 2 is shown included in a pipe joint for sealing the space between the pipe socket 46 and the spigot end 48 introduced therein. When the spigot end 48 is introduced into the socket the lip 4 acts for wiping away dirt from the outer surface of the spigot end so that this in a cleaned condition arrives to the sealing projection 10. In the embodiment according to FIG. 2, i.e. in an embodiment in which the binding surface 20 is not used, the projecting edge portion 16 forms a sealing lip which by engagement with the bottom of the groove 47 assists in preventing fluid from entering the pipe joint from outside the pipes.

Figure 6:
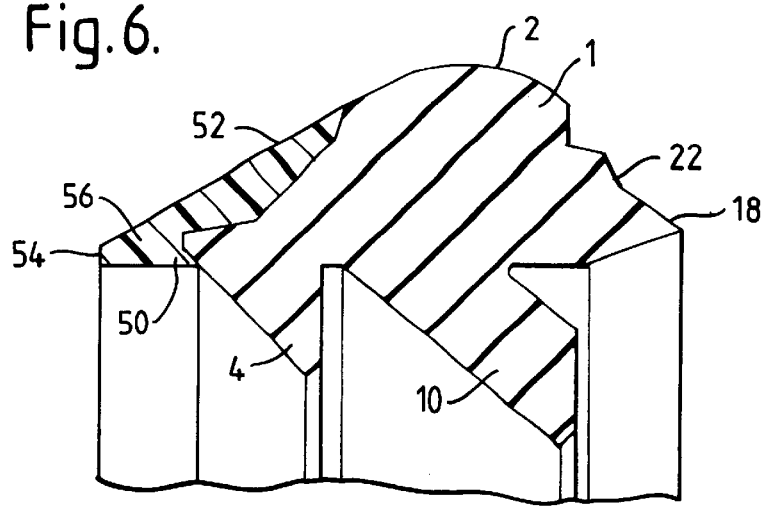
FIG. 6 is an axial section corresponding to FIG. 2 of a second type of sealing ring in which the element according to FIG. 1 is included.

In the embodiment of the sealing ring shown in FIG. 6 there is included a sealing element 1 of the same kind as the sealing element of the sealing ring according to FIG. 2, while the sealing ring has a retainer element 50 which is bound to the binding surface 20 of the sealing element 1. In the embodiment of the sealing ring according to FIG. 6 the binding surface 22 is not used for binding a retainer element to the sealing element. The retainer element 50 has an outer, conical surface 52 connecting with the surface portion 2 of the sealing element 1. The retainer element 50 has an edge portion 56 formed with a flat end surface 54.

Figure 7:
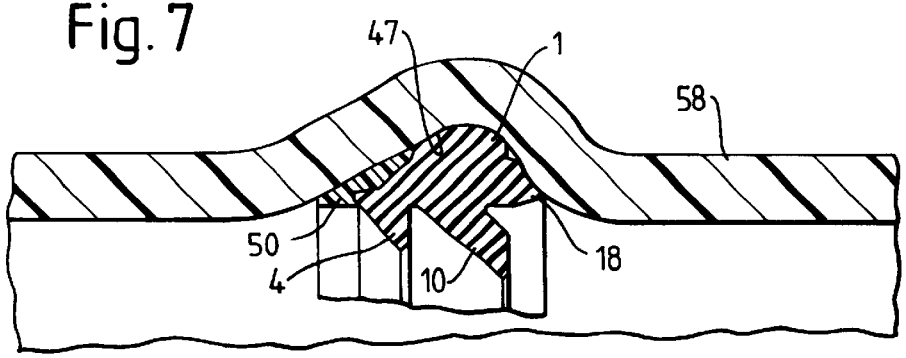
FIG. 7 is an axial section of the sealing ring according to FIG. 6 positioned in a groove in a pipe socket.

In FIG. 7 the sealing ring according to FIG. 6 is shown positioned in a groove 57 in a pipe socket 58. Because of the fact that the binding surface 22 is in this embodiment not used for binding a retainer element to the sealing ring the projecting edge portion 18 will as a sealing lip engage the bottom of the groove 57.

Figure 8:
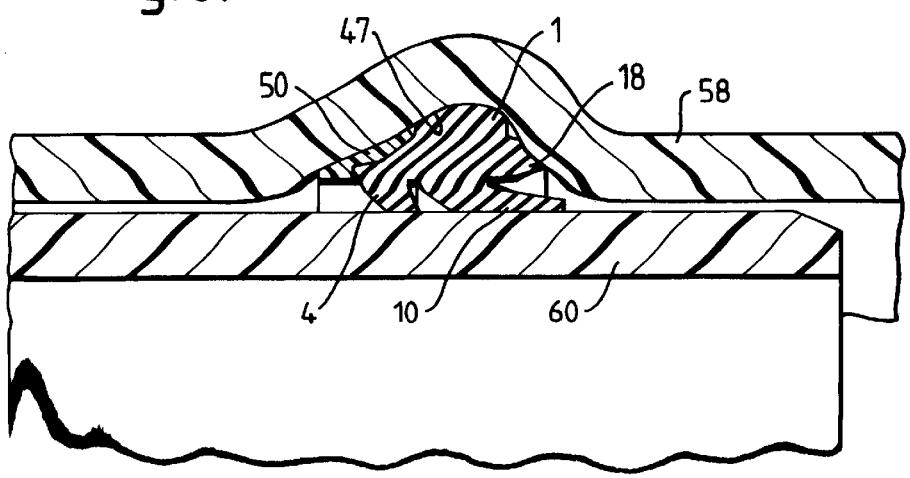
FIG. 8 is a section corresponding to FIG. 7 of a pipe joint in which a sealing ring according to the second embodiment is included.

In FIG. 8 there is shown a pipe joint consisting of the pipe socket 58 shown in FIG. 7 with the sealing ring positioned in the groove 57 therein and a spigot end 60 introduced into the socket. As is the case in the pipe joint according to FIG. 5 the lip 4 will at the introduction of the spigot end into the pipe socket wipe away dirt from the outer surface of the spigot end 60 for providing that the outer surface of the spigot end 60 will in a clean condition arrive to the sealing projection 10.

At high inner pressures in the pipe the retainer element 50 will prevent the sealing ring from being blown out of the pipe joint.

The manufacturing of the sealing ring according to FIGS. 6, 7 and 8 is conducted in the same way as the manufacturing of the sealing ring according to FIGS. 2–5, i.e. by positioning the sealing element 1 in a mould and injecting a plastic material into the mould space to be bound to the binding surface 20 of the sealing element 1.

Figure 9:
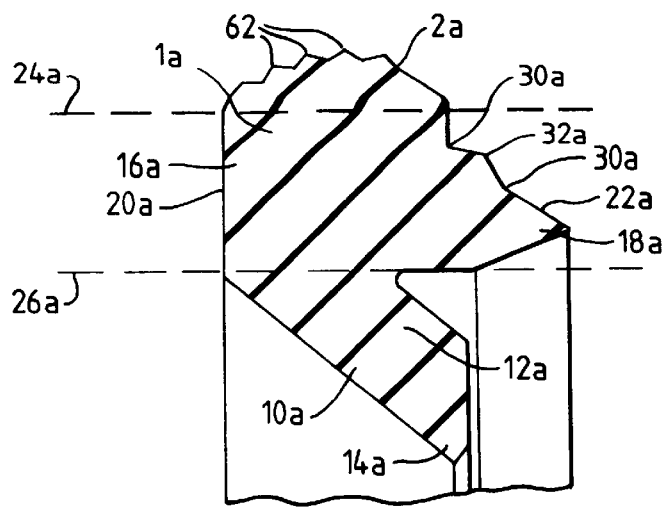
FIG. 9 is an axial section corresponding to FIG. 1 of a modified embodiment of an annular element according to the invention.

In FIG. 9 there is shown a modified embodiment of an annular element 1a which is intended to form a sealing element in a sealing ring for sealing a space between a socket and a spigot end, the sealing ring being positioned in a groove formed in the socket. At its radially outer surface the element 1a has a surface portion 2a of rounded shape adapted to engage the bottom of the groove in the socket. The surface portion 2a is provided with peripheral projections 62 for improving the sealing function in relation to the bottom of the groove. At the inner surface opposite to the surface portion 2a the sealing element 1a has an obliquely inwards directed sealing projection 10a of the same design as the sealing projection 10 of the annular element 1 according to FIG. 1. Thus, the sealing projection 10a initially has a portion 12a of uniform thickness and thereupon has portion 14a having decreasing thickness.

Between the surface portion 2a and the lip 10a the sealing element 1a has a flat edge portion 16a. Between the surface portion 2a and the sealing projection 10a the sealing element 1a also has an edge portion 18a projecting in the opposite direction in relation to the edge portion 16a.

The edge portion 16a forms a flat binding surface 20a at one side of the sealing element 1a, while the projecting edge portion 18a forms part of a binding surface 22a positioned at the opposite side of the sealing element 1a. The binding surfaces 20a and 22a are positioned between the axial planes 24a and 26a. The binding surface 22a is of the same design as the binding surface 22 in the sealing element 1 according to FIG. 1 and, thus, the binding surface 22a forms peripheral grooves 30a and an intermediate ridge 32a.

Figure 10:
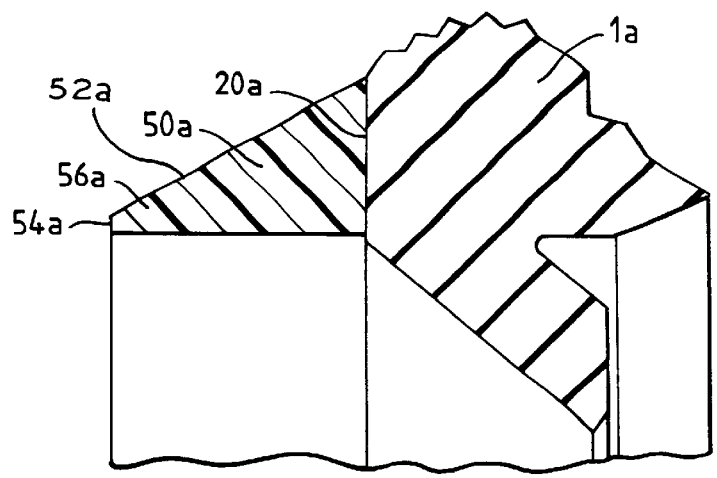
FIGS. 10 and 11 are axial sections of two different types of sealing rings manufactured according to the method of the invention and by means of the element according to the invention shown in FIG. 9.
Figure 11:
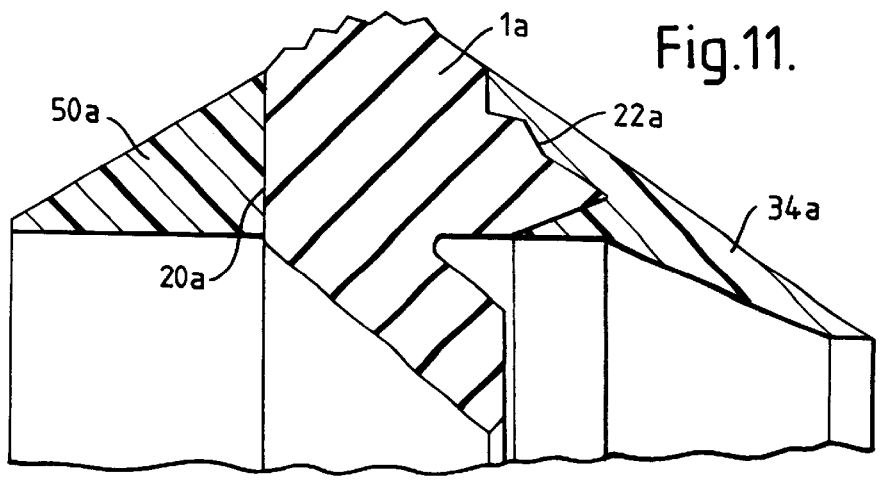

The sealing element 1a according to FIG. 9 is as shown in FIGS. 10 and 11 used for manufacturing two different types of sealing rings according to the method of the invention.

Thus, the embodiment of the sealing ring shown in FIG. 10 comprises a sealing element 1a according to FIG. 9 and a retainer element 50a which is bound to the binding surface 20a of the sealing element 1a. In the embodiment of the sealing ring according to FIG. 10 the binding surface 22a is not used for binding a retainer element to the sealing ring. The retainer element 50a has an outer, conical surface 52a which connects with the surface portion 2a of the sealing element 1a and has like the retainer element 50 of the sealing ring according to FIG. 6 an edge portion 56a having a flat end surface 54a. Like the sealing rings according to FIGS. 2 and 6 the sealing ring according to FIG. 10 is manufactured by positioning the sealing element 1a in a mould space having a mould surface for forming the retainer element 50a in connection with the binding surface 20a, whereupon a plastic material is injected into the mould space. The plastic material binds to the binding surface 20a, and when the plastic material has polymerized and the sealing ring has been removed from the mould the sealing ring has the appearance shown in FIG. 10. The sealing ring according to FIG. 10 is positioned in a groove in a socket and is used for sealing a space between a socket and a spigot end according to the same principles as shown in FIGS. 7 and 8.

Figure 4:
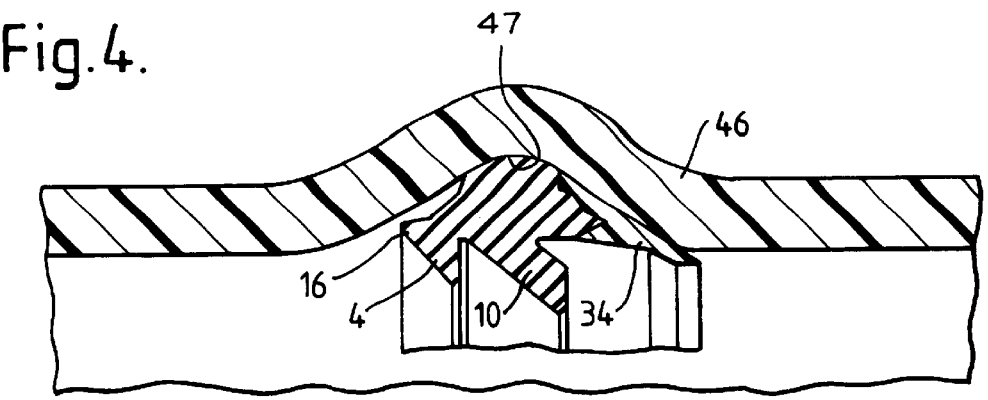
FIG. 4 is an axial section of the sealing ring shown in FIG. 2 positioned in a groove in a pipe socket.

In FIG. 11 there is shown a sealing ring comprising a sealing element 1a of the same design as the sealing element shown in FIG. 9 and the sealing element included in the sealing ring according to FIG. 10. The sealing ring according to FIG. 11 has two retainer elements, and in this embodiment of the sealing ring both binding surfaces 20a and 22a of the sealing element 1a are used. The retainer element bound to the binding surface 20a is of the same design as the retainer element 50a of the sealing ring according to FIG. 10, while the retainer element 34a bound to the binding surface 22a is of the same design as the retainer element 34 of the sealing ring according to FIG. 2. A sealing ring according to FIG. 11 can be used for forming a pipe socket around the sealing ring according to the method which is shown in FIGS. 3 and 4 and additionally has the function of the sealing rings according to FIGS. 6 and 10 to prevent that the sealing ring is blown out from the pipe joint at high inner pressures in the pipes.

The manufacturing of the sealing ring according to FIG. 11 takes place in the same way as the manufacturing of the sealing rings previously described, i.e. by positioning the sealing element 1a in a mould space having a mould surface for forming the two retainer elements 50a and 34a in connection with the binding surfaces 20a and 22a, respectively, whereupon the plastic material is injected into the mould space. Thus, the plastic material binds to the binding surfaces 20a and 22a, and when the plastic material has polymerized the sealing ring can be removed from the mould.

Figure 12:
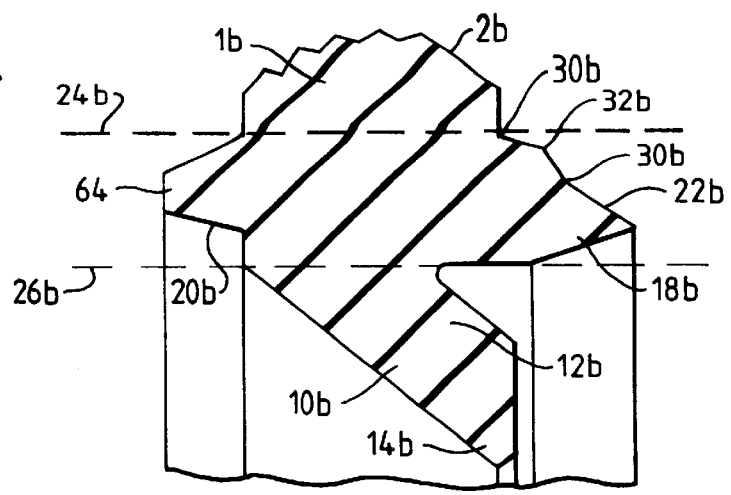
FIG. 12 is an axial section corresponding to FIGS. 1 and 9 of a further embodiment of an annular element according to the invention.
Figure 13:
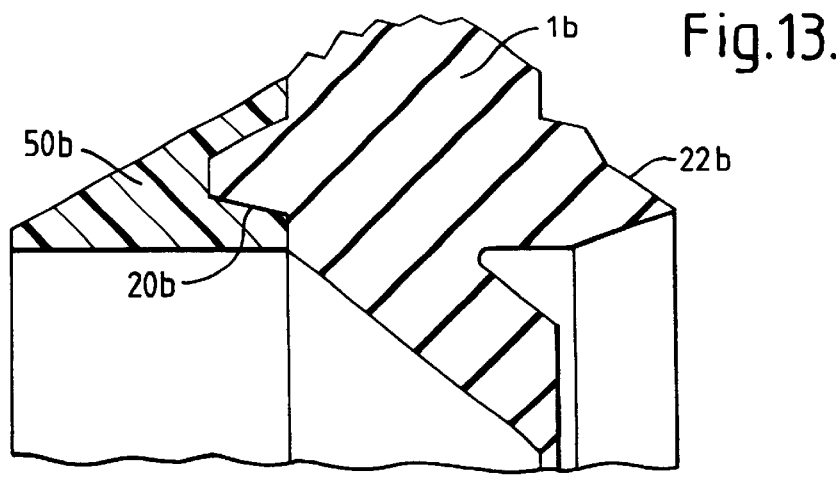
FIGS. 13 and 14 are axial sections of two different types of sealing rings manufactured according to the method of the invention and by means of the element according to the invention shown in FIG. 12.
Figure 14:
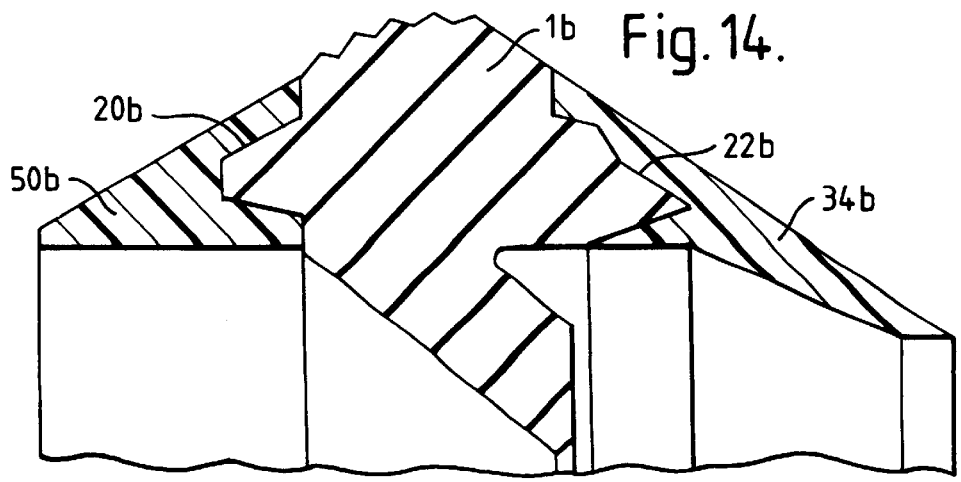

In FIG. 12 there is shown a further annular element 1b which is intended for forming sealing elements in two different embodiments of sealing rings according to FIGS. 13 and 14. The sealing element 1b and the sealing ring according to FIGS. 13 and 14 differ from the sealing element 1a according to FIG. 9 and the sealing rings according to FIGS. 10 and 11 only with regard to the design of the binding surface 20b. Thus, this binding surface 20b has an annular, central projection 64 having the object of providing a better binding of the retainer element 50b and to reduce the width of the wall of the retainer element 50b so as to facilitate the polymerization of the retainer element 50b. Otherwise corresponding parts of the sealing element 1b of FIG. 12 and the sealing rings according to FIGS. 13 and 14 are provided the same reference numerals as in FIGS. 9–11 with the replacement of the letter "a" by the letter "b".

It is recognized that it is possible to manufacture by means of the sealing element 1a and 1b sealing rings which are provided only with the retainer element 34a and 34b and in which the binding surface 20a and 20b, respectively, is not used.

Thus, the method according to the invention makes it possible to use one and the same sealing element 1a, 1b and 1c for manufacturing different types of sealing rings by using one or the other of the binding surfaces or both binding surfaces. Of course it is also possible to manufacture sealing elements having more than two binding surfaces which are used in different combinations for manufacturing sealing rings of many different kinds.

The invention can be modified within the scope of the following claims.

What is claimed is:

1. A method of manufacturing at least two different configurations of sealing rings adapted for sealing a space between an inner surface of a pipe socket provided with an annular groove and an outer surface of a spigot end introduced into the socket at a pipe joint, each said sealing ring comprising a first annular element and a second annular element that are bound to each other and with each element being of differing hardness, said method comprising:

provding at least two said second annular elements and two substantially identical said first annular elements, said first elements each having at least two binding surfaces having respective first and second locations on said first element, attaching one said second element to one of said binding surfaces on one of said first annular elements, said one binding surface on said first element being at said first location so as to form a first sealing ring of a first configuration; and attaching another second annular element to a said binding surface at the second location on the other of said first annular elements so as to form a second sealing ring of a second configuration different than said first configuration, whereby said first sealing element may form different configurations of sealing rings dependent on the binding surface selected and the shapes of the second elements attached thereto.

2. The method of claim 1 wherein said first annular elements are manufactured of a rubber-elastic material capable of forming a sealing element on each said sealing ring for sealing said space between said pipe socket inner surface and said spigot outer surface.

3. The method of claim 2 wherein said second elements are manufactured of a plastic material capable of forming a substantially rigid retainer element on each said sealing ring.

4. The method of claim 1 wherein said second elements are manufactured of a plastic material capable of forming a substantially rigid retainer element on each said sealing ring.

5. The method of claim 4 wherein at least one of said second elements is attached to its respective said first element by:

placing said first annular element in a mold space; and injecting into the mold space the material of said one second element in a flowable plastic state, the material polymerizing or vulcanizing in the mold while being bound to the first element.

6. The method of claim 3 wherein at least one of said second elements is attached to its respective said first element by:

placing said first annular element in a mold space; and injecting into the mold space the material of said one second element in a flowable plastic state, the material polymerizing or vulcanizing in the mold while being bound to the first element.

7. The method of claim 2 wherein at least one of said second elements is attached to its respective said first element by:

placing said first annular element in a mold space; and injecting into the mold space the material of said one second element in a flowable plastic state, the material polymerizing or vulcanizing in the mold while being bound to the first element.

8. The method of claim 1 wherein at least one of said second elements is attached to its respective said first element by:

placing said first annular element in a mold space; and injecting into the mold space the material of said one second element in a flowable plastic state, the material polymerizing or vulcanizing in the mold while being bound to the first element.

* * * * *